Feb. 9, 1926.

C. C. FARMER

VARIABLE LOAD BRAKE

Filed April 10, 1925

1,572,196

INVENTOR
CLYDE C. FARMER
BY Wm. M. Cady
ATTORNEY

Patented Feb. 9, 1926.

1,572,196

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed April 10, 1925. Serial No. 22,074.

*To all whom it may concern:*

Be it known that I, CLYDE C. FARMER, a citizen of the United States, residing at Pittsburgh, in the county of Allegheny and State of Pennsylvania, have invented new and useful Improvements in Variable-Load Brakes, of which the following is a specification.

This invention relates to fluid pressure brakes and has particular reference to load regulated brakes.

It has heretofore been proposed to provide a load regulated brake equipment having means adapted to be adjusted so as to regulate the braking power according to the load on the car and including a spring adapted to be compressed in proportion as the load is increased.

The compression of the spring by the load on the car is effected through a system of levers, which may be thrown into and out of operative relation by the operation of a fluid pressure piston, so that the lever system may be maintained in its inactive position while the car is running and thus prevent the spring from being acted upon by the load on the car except when the car is stopped. In order to lock the spring so that it will remain in its adjusted position while the car is running, a locking device is provided.

In previous equipments of this type, the locking means is released at the same time that the system of levers is thrown into position to permit the load on the car to act on the regulating spring. Accordingly, when there is a load on the car and the regulating spring is correspondingly compressed, as soon as the locking means is released, the pressure of said compressed spring will suddenly react through the system of levers so as to bring the cam member into engagement with the member carried by the car truck, with an undesirable hammer blow.

The principal object of my invention is to provide means for obviating the above difficulty.

Other objects and advantages will appear from the following more detailed description of the invention.

Figure 1:
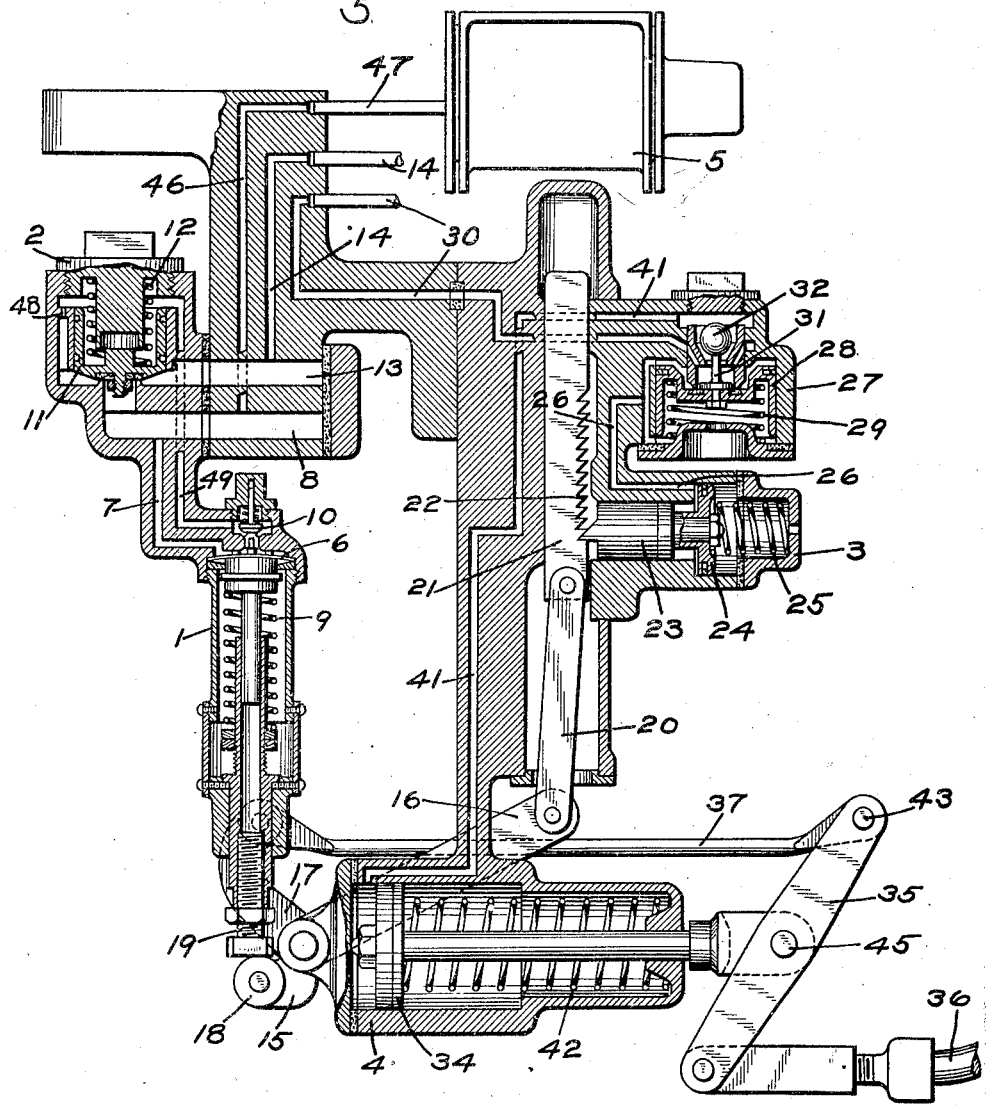
Figure 2:
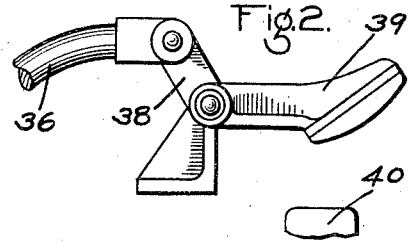

In the accompanying drawing; Fig. 1 is a diagrammatic sectional view of a load brake apparatus embodying my invention; and Fig. 2 a detail view of the adjusting means carried by the car body and the car truck.

According to my invention I provide means for maintaining the system of levers in locked position until after the cam member, which is carried by the car body, has been brought into engagement with the member carried by the car truck.

As shown in the drawing, the equipment may comprise a brake cylinder pressure limiting valve device 1, a brake cylinder supply valve device 2, a locking mechanism 3, a strut cylinder 4, and a brake cylinder 5.

The brake cylinder pressure limiting valve device 1 may comprise a flexible diaphragm 6, which is subject on one side to the pressure of fluid in the brake cylinder 5, as supplied through passage 7 from chamber 8, and on the opposite side to the pressure of a coil spring 9. A plunger 19 engaging the free end of the spring 9 is provided in order to vary the pressure exerted by said spring. The flexible diaphragm 6 is adapted to operate a valve 10, which controls the operation of the brake cylinder supply valve 2.

The brake cylinder supply valve 2 may comprise a valve piston 11 subject on one side to the pressure of a spring 12 and on the inner seated area of the opposite side to the pressure of fluid in a chamber 13, which is connected by passage and pipe 14 to the service port of the brake application valve, (not shown).

Pivotally mounted on the cap of the strut cylinder 4 is a crank arm member having crank arms 15, 16, and 17. A roller 18 pivotally mounted on the crank arm 15 is adapted to engage one end of the plunger 19 for effecting an adjustment of the spring 9, according to the load on the car.

The crank arm 16 is connected by link 20 to a ratchet bar 21, which is slidably mounted in the locking mechanism casting. The teeth 22 of the ratchet bar 21 are engageable by a pawl 23, which is operatively connected to a piston 24. The piston 24 is subject on one side to the pressure of a spring 25 and on the opposite side to the pressure of fluid as supplied through passage 26 from a valve device 27.

The valve device 27 may comprise a valve piston 28 subject on one side to the pressure of a spring 29 and on the inner seated area of the opposite side to the pressure of fluid in passage and pipe 30, which is connected to the usual door opening pipe. Secured to the seating face of the valve piston 28 is a stem member 31, which engages a ball check valve 32 and is adapted when said valve piston is held seated by the spring 29 to hold the ball check 32 from its seat.

The strut cylinder 4 is carried by the locking mechanism casting and contains a piston 34, the stem of which is pivotally connected to a lever 35. The lever 35 is pivotally connected at one end to a rod 36, and at the other end to a rod 37, which in turn is pivotally connected to the crank arm 17. The outer end of the rod 36 is pivotally connected to one arm 38 of a bell crank, which is mounted on the car body. The other arm 39 of the bell crank is adapted upon outward movement of the rod 36 to engage a member 40 mounted on the car truck.

In operation, when the car doors are opened, fluid under pressure is supplied in the usual way to the door opening pipe and consequently to pipe and passage 30. The valve piston 28 being held seated by the spring 29, fluid from passage 30 flows past ball check 32 to passage 41 and thence to the strut cylinder 33.

The fluid under pressure building up in cylinder 33 forces the piston 34 outwardly against the pressure exerted by spring 42. The pawl 23 being held in engagement with teeth 22 of latch bar 21, by the spring 25, the crank arms 15, 16, and 17 are held against movement, so that the pivot pin 43 will act as a fulcrum for the lever 35, and the outward movement of piston 34 will push the rod 36 so as to bring crank arm 39 into engagement with the member 40.

The spring 29 is of such resistance as to hold the valve piston 28 seated, against the pressure of fluid acting on the inner seated area of the opposite side, until the pressure of fluid in the strut cylinder 4 and consequently on the inner seated area of said valve piston has built up sufficiently to move the piston 34 outwardly, at which time said valve piston will be unseated against the pressure exerted by the spring 29.

The unseating of valve piston 28 permits the ball check 32 to seat, thereby preventing back flow of fluid from cylinder 4 and at the same time opens communication from passage 30 and the door opening pipe, through passage 26, to one side of piston 24. The fluid under pressure supplied from passage 30 acting on piston 24 moves said piston to the right against the pressure exerted by the spring 25 so as to disengage the pawl 23 from the teeth 22 of ratchet bar 21.

If the load on the car is now increased, the car springs will be compressed, so that the member 40 acting on the arm 39 will cause a counter-clockwise movement of the bell crank, which exerts a force through the rod 36 to cause a clockwise rotation of the lever 35, with the pivot pin 45 acting as a fulcrum. The rod 37 then acts to rotate crank arm 17 so as to rock the crank arm 15 in a clockwise direction, forcing the plunger 19 upwardly to compress the spring 9 correspondingly with the increase in load.

When the car has been loaded and the car doors are closed, the door opening pipe is connected to atmosphere in the usual operation of the door control apparatus, so that fluid acting on the latch piston 24 may flow through passage 26 past unseated valve piston 28, thence through passage and pipe 30 and the door opening pipe to atmosphere, thereby permitting the spring 25 to force the piston 24 to the left and cause pawl 23 to engage the teeth of rack bar 21.

The ball check 32 prevents the escape of fluid from the strut cylinder 33 until after the pressure in the door opening pipe and consequently in passages 26 and 30 has been reduced to a degree slightly less than the pressure exerted by spring 29, at which time said spring will seat the valve piston 28, thereby unseating ball check 32 and permitting fluid from cylinder 33 to flow to atmosphere by way of passages 41 and 30 and the door opening pipe.

It will now be seen that the piston 34 is maintained in its outermost position until after the piston 24 has moved to the left, causing pawl 23 to engage the teeth 22 of the ratchet bar 21, thereby locking the mechanism in adjusted position.

If a service brake application is effected in order to bring the car to a stop at the next loading place, fluid under pressure from the brake application valve (not shown) will be supplied through pipe 14 to chamber 13, where it acts on the exposed area of valve piston 11. Said valve piston is then unseated, permitting fluid to flow to chamber 8, thence through passage 46 and pipe 47 to the brake cylinder 5.

Fluid from chamber 13 also equalizes through choked port 48 to the spring side of valve piston 28 and escapes therefrom through passage 49, past unseated valve 10, through passage 7 to chamber 8, and thence through passage and pipe 47 to the brake cylinder 5.

The pressure of fluid supplied to the brake cylinder is also supplied through passage 7 to diaphragm 6 and when the pressure in the brake cylinder has been increased to a predetermined degree, corresponding with the previous adjustment of spring 9 in accordance with the load on the car, said diaphragm will be moved downwardly, permitting the valve 10 to be seated by its spring.

Since the seating of the valve 10 prevents further escape of fluid under pressure from the spring side of the valve piston 28, fluid quickly equalizes on opposite sides thereof, so that the spring 12 will seat said valve piston and prevent further flow of fluid under pressure to the brake cylinder.

It will be evident that the apparatus will operate in a similar manner to reduce the pressure of spring 9 when the load on the car is decreased, since under such a condition the crank arm 15 would be rocked in a counter-clockwise direction corresponding to the relative positions of the arms 39 and member 40.

Having now described my invention, what I claim as new and desire to secure by Letters Patent, is:—

1. In a load brake, the combination with means adjustable according to the load on the car for regulating the braking power, of fluid pressure operated means for locking said adjustable means in an adjusted position, means operated by fluid under pressure for operatively connecting up said adjustable means so as to be adjusted according to the load on the car, and means for supplying fluid under pressure to said locking means upon a predetermined increase in pressure of fluid supplied to said operatively connecting means.

2. In a load brake, the combination with means adjustable according to the load on the car for regulating the braking power, of a locking device for locking said means in an adjusted position, and operated by fluid under pressure to release said locking device, a piston operated by fluid under pressure for operatively connecting said means so as to be controlled according to the load on the car, and means operated by fluid supplied to said piston for controlling the supply of fluid to said locking device.

3. In a load brake, the combination with means adjustable according to the load on the car for regulating the braking power, of a locking device for locking said means in an adjusted position and movable to a release position, mechanism movable to a position for operatively connecting said means so as to be adjusted according to the load on the car, and means for effecting the movement of said mechanism to said position in advance of the movement of said locking device to release position.

4. In a load brake, the combination with means adjustable according to the load on the car for regulating the braking power, of a locking device for locking said means in an adjusted position, and operated by fluid under pressure to release said locking device, a piston operated by fluid under pressure for operatively connecting said means so as to be controlled according to the load on the car, and a valve piston operated upon a predetermined increase in the pressure of fluid supplied to said piston for supplying fluid to said locking device.

5. In a load brake, the combination with means adjustable according to the load on the car for regulating the braking power, of a locking device for locking said means in an adjusted position and released by fluid under pressure, and means operated upon a predetermined increase in fluid under pressure for supplying fluid to said locking device.

6. In a load brake, the combination with means adjustable according to the load on the car for regulating the braking power, of a locking device for locking said means in an adjusted position and releasable by fluid under pressure, and a valve piston subject on one side to the pressure of a spring and operated by fluid under pressure supplied to the opposite side for supplying fluid under pressure to said locking device.

7. In a load brake, the combination with means adjustable according to the load on the car for regulating the braking power, of a locking device for locking said means in an adjusted position and releasable by fluid under pressure, valve means operated by fluid under pressure for supplying fluid to said locking device, and means controlled by said valve means for controlling the release of fluid from said piston.

8. In a load brake, the combination with means adjustable according to the load on the car for regulating the braking power, of a locking device for locking said means in an adjusted position and releasable by fluid under pressure, valve means operated by fluid under pressure for supplying fluid to said locking device, and a check valve controlled by said valve means for controlling the release of fluid from said piston.

9. In a load brake, the combination with means adjustable according to the load on the car for regulating the braking power, of a locking device for locking said means in an adjusted position and movable to a release position, mechanism movable to a position for operatively connecting said means so as to be adjusted according to the load on the car, and means for effecting the movement of said mechanism to said position in advance of the movement of said locking device to release position and for effecting the movement of said locking device to its locking position in advance of the movement of said mechanism from its operatively connecting position.

In testimony whereof I have hereunto set my hand.

CLYDE C. FARMER.